United States Patent 3,689,449
Patented Sept. 5, 1972

3,689,449
COMPOSITION FOR IMPARTING ANTI-BACTERIAL CHARACTERISTICS TO VINYL RESINS
Charles C. Yeager, Glen Ellyn, and Ronald C. Wilson, Mount Prospect, Ill., assignors to Ventron Corporation, Chemicals Division
No Drawing. Filed Apr. 1, 1971, Ser. No. 130,491
Int. Cl. C08f 45/34
U.S. Cl. 260—33.4 P          4 Claims

ABSTRACT OF THE DISCLOSURE

Vinyl resins while inert to microbial and fungal attack, can act as carriers for microorganisms and phenoxarsine compounds are used to impart microbicidal properties to such resins. The amount of phenoxarsine compounds required to impart such microbicidal properties to vinyl resin materials may be markedly reduced when the phenoxarsine compounds are used in conjunction with hexachlorodimethyl sulfone which acts to promote the effectiveness of the phenoxarsine compounds even though the sulfone per se imparts no microbicidal properties to a vinyl material. In a preferred embodiment of the invention, hexachlorodimethyl sulfone is incorporated into the nonyl phenol solution of, for example, 10,10' oxybisphenoxarsine and the phenol solution incorporated into vinyl resin plasticizers, such as epoxidized soya, so that the phenoxarsine and sulfone solute components will be present in the resin in amounts of 50 to 250 parts per million of phenoxarsine compound and 100 to 1000 parts per million of sulfone compound.

---

This invention relates to resins having bactericidal properties. More particularly, it relates to resins such as polyvinyl esters containing phenoxarsine compounds which display marked anti-bacterial and anti-fungal characteristics. Still more particularly, it relates to molded vinyl resins and to plasticizers therefor in which a combination of phenoxarsine compounds and a sulfone derivative are incorporated as components of the plasticizers, the sulfone derivative acting as a promoter to enhance the effectiveness of the phenoxarsine compounds.

In accordance with the invention a solution of phenoxarsine in a solvent having a labile hydroxyl group, such as nonyl phenol, is prepared and hexachlorodimethyl sulfone is dissolved in the phenoxarsine-phenol solution. The solution of phenoxarsine and sulfone is then introduced into a compatible vinyl resin plasticizer and the plasticizer composition is introduced into vinyl resin compositions where the presence of the sulfone derivative improves the activity of and promotes the effectiveness of the phenoxarsine compounds so that markedly smaller amounts of phenoxarsine compounds are required for equal microbicidal effectiveness than when using phenoxarsine compounds in the absence of the sulfone derivative.

In general, resinous materials such as polymers and copolymers of polyvinyl esters are inert to microbial and fungal attack. Nevertheless, they readily act as carriers for microorganisms and the surface of resinous articles may become contaminated with materials which function as nutrients for the microorganisms so that the growth of the latter can occur on such surfaces. In addition to being a continuous source of contamination, the articles themselves are often subject to deterioration due to bacterial and fungal attack on the plasticizers incorporated into the resins to impart certain desirable physical properties and to facilitate molding operations.

It has been common practice, in order to protect resins from bacterial and fungal deterioration to incorporate agents for the purpose of rendering the resinous products bacteriostatic. Most of these agents have suffered from the disadvantage that their solubility in the resins or in the plasticizers were limited, or they were relatively fugitive, as a consequence of which their effectiveness was of limited duration. A further disadvantage has been that the known agents must be used in relatively large concentrations, as for example, 2% to 4% of the resin. This is ordinarily objectionable both from the viewpoint of cost and because the excessive amount of bacteriostat may adversely affect the color or the physical properties of the resin. The method of incorporating the agents capable of imparting bactericidal and fungicidal properties, used hereto, has been to mill in, for example, powdered fungicidal agent or to mix in the resin being compounded, a solution of the agent in such compatible fugitive solvents as toluene, benzene, and the like.

It is known that phenoxarsine compounds which are insoluble in the fugitive solvents commonly available in the plastics industry, for example, glycols such as propylene glycol, ethers such as ethylene glycol monobutyl ether, ketones such as ethyl methyl ketone, etc., and also insoluble in plasticizers such as dioctyl phosphate, tricresyl phosphate, epoxidized tallate, ethyl salicylate, and the like, can be incorporated in effective small amounts in a unique solution form compatible with the plasticizers to provide the vinyl compositions with excellent anti-bacterial and anti-fungal properties. The phenoxarsine compounds when incorporated by the phenol solvent solution method display an effective microbicidal and fungicidal action rather than a mere inhibition of the growth of such bacteria. Effective small amounts of the phenoxarsine compounds per se incorporated in resins through the use of phenol solvent to produce a homogeneous single phase system of plasticizer, have been of the order of 200 to 1000 parts per million.

Now it has been discovered that, when hexachlorodimethyl sulfone is incorporated with the phenoxarsine compound, in the form of a solution, into a plasticizer solution and vinyl resins are plasticized with such compositions, the amount of phenoxarsine compound to be incorporated in the resin can be reduced from amounts of 200 to 1000 p.p.m. (.02% to .1%) to amounts of the order of 25% to 50% of that required in the absence of sulfone, i.e., 50 to 500 parts per million (0.005% to .05%) without any loss of bactericidal effectiveness. Such activation, i.e., improvement in activity of the phenoxarsine compounds, is unexpected and unpredictable because when hexachlorodimethyl sulfone per se is present in the vinyl resins in amounts as high as the order of 0.4% (4000 p.p.m.), the products exhibit extremely little or no bactericidal or fungicidal properties. Nevertheless, the presence in vinyl resins of hexachlorodimethyl sulfone in conjunction with the phenoxarsine component, in amounts of the order of 200 to 1000 parts per million produces the desired phenoxarsine activating effect.

The phenoxarsine compounds to be employed in accordance with the present invention have the following general formula

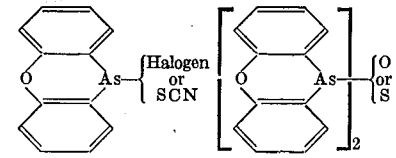

Derivatives of the phenoxarsines useful in the instant invention are, for example, the halogen derivatives such as 10 - chlorophenoxarsine, 10 - iodo - phenoxarsine, 10-bromophenoxarsine, 4 methyl - 10 - chlorophenoxarsine, 2 - tertiary butyl - 10 - chlorophenoxarsine, 1,4 dimethyl-10 - chlorophenoxarsine, 2 methyl - 8,10 - dichloro phenoxarsine, 1,3, 10 trichloro phenoxarsine, 2,6, 10 trichloro phenoxarsine, 2,8,10 trichloro phenoxarsine, 1,2,4,10 tetrachloro phenoxarsine and, the oxygen derivatives such as the 10,10' oxybis phenoxarsine.

A composition of matter useful for plasticizing vinyl resins and imparting microbicidal properties thereto comprises a liquid plasticizer for vinyl resins, 0.01% to 0.1% of a dimethyl sulfone derivative and a microbicidal amount of phenoxarsine compound selected from the group consisting of 10 halophenoxarsines, alkyl substituted 10 halophenoxarsines, halogen substituted 10 halophenoxarsines and derivatives of phenoxarsines. These compositions are prepared for incorporation into a plasticizer and for subsequent incorporation into the resins by dissolving a phenoxarsine compound selected from the group consisting of 10,10' - oxybis - phenoxarsine, 10 thiocyanato phenoxarsine and 10,10' thiobis phenoxarsine, in a solvent selected from the group consisting of phenol, alkyl phenol, chlorinated phenols, amino phenols, dihydric phenols, aliphatic alcohols having 5 to 12 carbon atoms and monocarboxylic acid having 5 to 12 carbon atoms, and dissolving hexachlorodimethyl sulfone in the phenoxarsine solution, said solvent and solutes being uniformly distributed in said plasticizer to form a single phase system. Generally, the phenoxarsines have a higher solubility in compounds such as phenols and the combination of phenoxarsine and the phenols are preferred because quantities of phenoxarsines of the order of 300 to 500 parts per million are obtainable with lesser quantities of the solvent phenols which phenols cannot be tolerated in, for example, vinyl resins in two great a proportion.

Materials useful as a solvent for the phenoxarsine compounds are those having a labile hydroxyl group. Useful compounds are mono and di-hydroxy compounds, for example, phenol, phenol derivatives, for example, the alkyl phenols, such as cresols, e.g., methyl phenol, 2 - methyl-5-isopropyl phenol, 3 - methyl - 6 - isopropyl phenol, and the like. Chlorinated phenols such as 4-chloro-2-phenylphenol, and 6 - chloro - 2 - phenylphenol. Amino phenols such as p-aminophenol and m-aminophenol. Dihydric phenols such as catechol, resorcinol, 3,5, dihydric toluene, and the like, aliphatic alcohols having 5 to 12 carbon atoms such as lauric, 2 ethyl hexanol, octenol, 1,2,6-hexantriol, 2-methoxy methyl - 2,4, dimethyl pentane diol, and the like, and monocarboxylic acid having 5 to 12 carbon atoms such as caproic acid, 2-ethyl hexoic acid, isotoic acid, and the like. The solvent carrier compatible with the plasticizers which is preferred, is a non-toxic alkyl phenol, such as nonyl phenol, dodecyl phenol, di-sec amyl phenol, and the like.

The solvent solution of sulfone and phenoxarsine generally is distributed uniformly in a plasticizer for vinyl resins to form a single phase system prior to admixing with the vinyl resin material, although the compositions can be admixed directly with vinyl resin material and the admixture processed to a desired solid physical form.

Typical plasticizers are tricresyl phosphate, dipropylene glycol, dibenzoate, diphenylcresyl phosphate, epoxidized soya, epoxidized tallate, dioctyl azelate, alkyl aryl phosphates, diisobutyl phthalate, hydrogenated methyl rosin ester, and the like.

The solvent solutions of sulfone and phenoxarsine which are preferred are those which hold in stable solution between about 10% and about 25% by weight of the dissolved solids. Such a solution can be dissolved and/or dispersed in the plasticizer in amounts constituting between about 2% and about 10% by weight of the total mixture with amounts in the range between about 4% and about 6% preferred. The plasticizer compositions thus contain between about 0.2% and 2.5% of hexachlorodimethyl sulfone and between about 0.1% and 1.25% of phenoxarsine compound, between about 1.7% and 6.25% of solvent and between about 90% and 98% of plasticizer.

When such a plasticizer is incorporated in a vinyl resin in the quantities set forth, the hexachlorodimethyl sulfone and phenoxarsine contents of a processed vinyl resin will be in the ranges between about 0.02% and 0.1% and 0.01% and 0.05%, respectively.

For purposes of establishing the activation effect of the sulfone, a nonyl phenol solution of hexachlorodimethyl sulfone (identified in the tables as N–1386) was incorporated in epoxidized soya, and the plasticizer added to vinyl resin in quantities to incorporate 0.1%, 0.25% and 0.4%, respectively. The vinyl resin film containing the sulfone was cut into rectangular test samples and the samples tested to determine their microbicidal properties.

Samples of the resin as is, or after leaching for 24 hours or weathering for 100 hours indicated by the letters A, L and W, respectively, were placed on nutrient agar surfaces in petri dishes which had been inoculated with a microorganism (*Staph. aureas*, and *E. coli* microorganisms and mixed spores).

At the end of the test periods, which were the same as described hereinafter in the examples, the petri dishes were inspected for any clear zones extending from the edges of the samples which would indicate inhibition of microorganism growth.

Results were as follows:

| Compound and concentration in formulation | *Staph.aureus* | | | *E. coli* | | | Mixed spores | | |
|---|---|---|---|---|---|---|---|---|---|
| | As is | L | W | As is | L | W | As is | L | W |
| N–1386, 0.1% | GCA | GCA | | GCA | GCA | | HG | HG | |
| N–1386, 0.25% | GCA | GCA | GCA | GCA | GCA | | SG | MG | SG |
| N–1386. 0.4% | GCA | GCA | GCA | GCA | GCA | GCA | SG | SG | HG |

Note.—GCA=indicates growth contact area is adjacent the sample; SG=indicates slight growth adjacent the vinyl sample; MG=indicates moderate growth adjacent the vinyl sample; HG=indicates heavy growth adjacent the vinyl sample.

In order to more fully illustrate the invention, the following examples are included. These examples are intended to be illustrative and are given without any intention that the invention be limited thereto.

EXAMPLE I

A solution, indicated hereinafter as solution A, was prepared by mixing 10 parts by weight of 10 chlorophenoxarsine into 70 parts by weight of nonyl phenol. The mixture was heated to approximately 230° F. to attain a temperature sufficient to melt the 10-chlorophenoxarsine. After agitation of the phenoxarsine-nonyl phenol solution until a uniform solution was attained, the solution was cooled to a temperature of approximately 200° F. and 20 parts by weight of hexachlorodimethyl sulfone was added to the cooled solution. After agitation until a uniform solution was attained, the solution was cooled to room temperature.

100 parts of the phenol solution A was then mixed with 1900 parts by weight of epoxidized soya.

A plastisol was prepared from the epoxidized soya containing solution A which had the following formulation:

1000 parts polyvinyl chloride resin (Geon 121),
435 parts of dioctyl azelate plasticizer,
50 parts of solution A, and
15 parts barium-cadmium-zinc soap.

The liquid ingredients were mixed and then the solid resin added slowly with agitation. After thorough admixture, the resin mixture was molded to a film of approximately 100 mil thickness and heated for 10 minutes at 350° F. to effect a cure.

Three groups of rectangular test panels indicated as A, L and W were cut from the vinyl film. Group L was subjected to leaching with water for 24 hours. Group W was subjected to weathering for 100 hours. Groups A, L and W were subjected to the following test to establish fungicidal activity.

Test panels were placed on nutrient agar surfaces in petri dishes, each agar surface having been previously inoculated with a selected microorganism. The petri dishes were covered and incubated for a period of 14 days for fungi at a temperature of 30° C., and for 34 hours at a temperature of 37° C. for bacteria. At the end of this period, the clear zone indicating inhibition of growth extending outwardly from the test panels was measured. The results are given below in Table I, listing the millimeters of clear zone.

TABLE I

| Compound and concentration in formulation | Staph. aureus | | | E. coli | | | Mixed spores | | |
|---|---|---|---|---|---|---|---|---|---|
| | As is | L | W | As is | L | W | As is | L | W |
| CPA, 0.025%, N-1386, 0.05% | 3 | 1 | 0.5 | 1 | 0 | GCA | 4 | 3 | 3 |
| CPA, 0.025% | 1 | 0 | GCA | GCA | GCA | GCA | 2 | 3 | 2 |
| CPA, 0.05% | 3 | 2 | 1 | 2 | 0 | GCA | 3 | 3 | 2 |

EXAMPLE II

A solution, indicated hereinafter as solution B, was prepared by mixing 10 parts by weight of 10,10′ oxybis phenoxarsine into 70 parts by weight of di-secondary amyl phenol. The mixture was heated to approximately 230° F. to attain a temperature sufficient to melt the 10,10′ oxybis phenoxarsine. After agitation until a uniform solution was attained, the solution was cooled to a temperature of approximately 210° F. and 20 parts by weight of hexachlorodimethyl sulfone was added. After agitation until a uniform solution was attained, the solution was cooled to room temperature.

100 parts of the phenol solution B was then mixed with 1900 parts by weight of epoxidized soya.

A plastisol was prepared from the epoxidized soya containing solution B which had the following formulation:

1000 parts polyvinyl chloride resin (Geon 121),
435 parts of dioctyl azelate plasticizer,
50 parts of solution B, and
15 parts barium-cadmium-zinc soap.

The liquid ingredients were mixed and then the solid resin added slowly with agitation. After thorough admixture, the resin mixture was molded to a film of approximately 100 mil thickness and heated for 10 minutes at 350° F. to effect a cure.

Three groups of rectangular test panels indicated as A, L and W were cut from the vinyl film. Group L was subjected to leaching with water for 24 hours. Group W was subjected to weathering for 100 hours. Groups A, L and W were subjected to the following test to establish fungicidal activity.

Test panels were placed on nutrient agar surfaces in petri dishes, each agar surface having been previously inoculated with a selected microorganism. The petri dishes were covered and incubated for a period of 14 days for fungi at a temperature of 30° C., and for 34 hours at a temperature of 37° C. for bacteria. At the end of this period, the clear zone indicating inhibition of growth extending outwardly from the test panels was measured. The results are given below in Table II.

TABLE II

| Compound and concentration in formulation | Staph. aureus | | | E. coli | | | Mixed spores | | |
|---|---|---|---|---|---|---|---|---|---|
| | As is | L | W | As is | L | W | As is | L | W |
| 10,10′, 0.025%, N-1386, 0.05% | 9 | 7 | 5 | 3 | 1 | 0.5 | 11 | 9 | 10 |
| 10,10′, 0.025% | 8 | 6 | 4 | 2 | 0.2 | GCA | 5 | 7 | 5 |
| 10,10′, 0.05% | 10 | 5 | 6 | 2 | 1 | 0.2 | 7 | 8 | 5 |

The foregoing description is given for clearness and understanding only and no unnecessary limitations should be understood therefrom as modifications will be obvious to those skilled in the art.

What is claimed is:

1. A composition of matter useful for plasticizing vinyl resins and imparting microbicidal properties thereto which comprises a liquid plasticizer for vinyl resins, 0.2% to 2.5% by weight of hexachlorodimethyl sulfone and 0.1% to 1.25% by weight of a phenoxarsine compound selected from the group consisting of 10 halophenoxarsines, alkyl substituted 10 halophenoxarsines, halogen substituted 10 halophenoxarsines and the oxygen derivative 10,10′-oxybis phenoxarsine, said sulfone and phenoxarsine compound being present in the plasticizer in the form of solutes in a solvent selected from the group consisting of phenol, alkyl phenol, chlorinated phenols, amino phenols, dihydric phenols, aliphatic alcohols having 5 to 12 carbon atoms and monocarboxylic acid having 5 to 12 carbon atoms, said solvent and solutes being uniformly distributed in said plasticizer to form a single phase system.

2. A composition according to claim 1 wherein the sulfone and phenoxarsine compounds are present in the form of solutes in a nonyl phenol solution.

3. A composition of matter comprising a uniform admixture of a vinyl resin and a vinyl resin plasticizer containing 0.02% to 0.1% of hexachlorodimethyl sulfone and a microbicidal amount of a phenoxarsine compound selected from the group consisting of 10-halophenoxarsines, alkyl substituted 10 halophenoxarsines, halogen substituted 10 halophenoxarsines and wherein said derivatives are selected from the group consisting of the oxygen derivative 10,10′-oxybis phenoxarsine, present in said plasticizer as the solute in a solvent selected from the group consisting of phenol, alkyl phenols, chlorinated phenols, amino phenols, dihydric phenols, aliphatic alcohols having 5 to 12 carbon atoms and monocarboxylic acids having 5 to 12 carbon atoms, said solvent and solute being uniformly distributed in said plasticizer to form a single phase system.

4. A composition according to claim 3 wherein the microbicidal amount of phenoxarsine compound is between 25% and 50% of that required in the absence of said sulfone.

References Cited

UNITED STATES PATENTS 3,288,674  11/1966  Yeager _____ 424—297
2,959,517  11/1960  Bowers _____ 424—337
3,228,830   1/1966  McFadden _____ 424—297

MORRIS LIEBMAN, Primary Examiner

P. R. MICHL, Assistant Examiner

U.S. Cl. X.R.

106—15 AF; 260—45.75 R; 424—297, 337